(12) United States Patent
Smithers et al.

(10) Patent No.: US 7,292,902 B2
(45) Date of Patent: Nov. 6, 2007

(54) FRAME-BASED AUDIO TRANSMISSION/STORAGE WITH OVERLAP TO FACILITATE SMOOTH CROSSFADING

(75) Inventors: Michael J. Smithers, San Francisco, CA (US); Kenneth James Gundry, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 952 days.

(21) Appl. No.: 10/712,791

(22) Filed: Nov. 12, 2003

(65) Prior Publication Data

US 2005/0102049 A1 May 12, 2005

(51) Int. Cl.
*G06F 17/00* (2006.01)
(52) U.S. Cl. .................................. 700/94; 375/243
(58) Field of Classification Search .............. 700/94; 381/119; 375/242, 243; 369/1, 4; 704/212, 704/228
See application file for complete search history.

(56) References Cited

U.S. PATENT DOCUMENTS

| 3,872,503 | A | 3/1975 | Shutterly |
| 4,555,737 | A | 11/1985 | Heitmann |
| 4,717,972 | A | 1/1988 | Heitmann |
| 4,961,116 | A | 10/1990 | Kanamaru et al. |
| 5,109,417 | A | 4/1992 | Fielder et al. |
| 5,140,473 | A | 8/1992 | Murakami |
| 5,208,678 | A | 5/1993 | Nakagawa |
| 5,225,945 | A | 7/1993 | Mine et al. |
| 5,903,872 | A | 5/1999 | Fiedler |
| 5,913,190 | A | 6/1999 | Fielder |
| 5,913,191 | A | 6/1999 | Fielder |
| 6,124,895 | A | 9/2000 | Fielder |
| 6,952,668 | B1* | 10/2005 | Kapilow ............... 704/206 |
| 7,117,156 | B1* | 10/2006 | Kapilow ............... 704/267 |
| 2002/0116178 | A1 | 8/2002 | Crockett |
| 2004/0196989 | A1* | 10/2004 | Friedman et al. ......... 381/119 |
| 2005/0068886 | A1* | 3/2005 | Wang et al. ............. 370/210 |

FOREIGN PATENT DOCUMENTS

EP        1067551 A2    1/2001

(Continued)

OTHER PUBLICATIONS

Craven, Peter, "Lossless Coding for Audio Discs," Journal of the Audio Engineering Society, vol. 44, No. 9, Sep. 1996.

(Continued)

*Primary Examiner*—Vivian Chin
*Assistant Examiner*—Jason Kurr
(74) *Attorney, Agent, or Firm*—Gallagher & Lathrop; Thomas A. Gallagher

(57) ABSTRACT

Methods for splicing PCM audio frames form modified frames by appending to each frame either a portion of the next preceding frame or the next following frame. According to a first approach, splices are obtained by fading up and fading down a frame end and a frame appendage only at a splice point, and overlapping and combining to provide a crossfade at the splice. Alternatively, every frame end and frame appendage is faded up and faded down, overlapped and combined. A subtractive method of providing complementary fade-up and fade-down reduces rounding errors.

36 Claims, 6 Drawing Sheets

FOREIGN PATENT DOCUMENTS

| | | |
|---|---|---|
| EP | 1094464 A2 | 4/2001 |
| GB | 2378873 A | 2/2003 |

OTHER PUBLICATIONS

Watatani, Yoshizumi, et al., "The FM Audio Signal Recording System for 8mm Video," IEEE Transactions on Consumer Electronics, vol. CE-30, No. 4, Nov. 1984, pp. 592-597.

Fielder, Louis D., et al., "Professional Audio Coder Optimized for Use with Video," presented at the 107th Convention Sep. 24-27, 1999, Audio Engineering Society Preprint, 5033 (K-1).

Lyman, Stephen, "Understanding Dolby E," Broadcast Engineering Sep. 1999, pp. 1-6.

Smithers, Michael J., et al., "Ultra High Quality, Video Frame Synchronous Audio Coding," presented at the 114th Convention Mar. 22-25, 2003, Audio Engineering Society, Convention Paper 5853, pp. 1-14.

\* cited by examiner

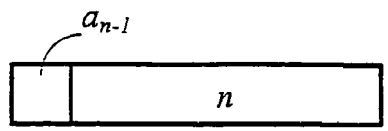
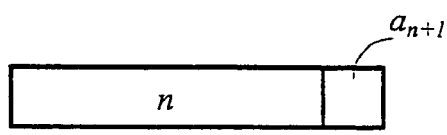
FIG. 4         FIG. 5
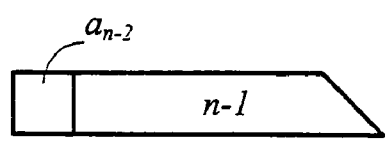
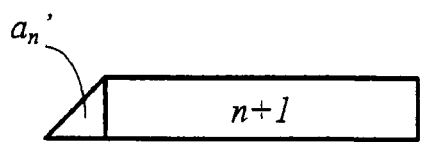
FIG. 6a
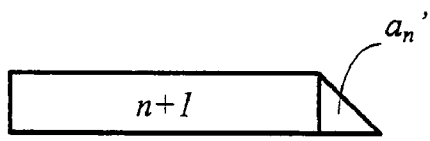
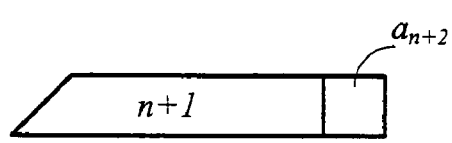
FIG. 7a
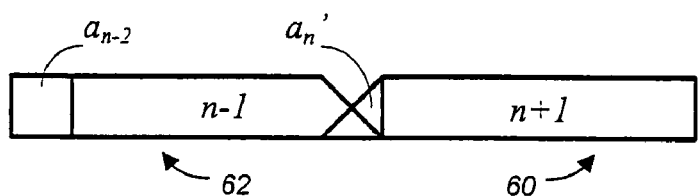
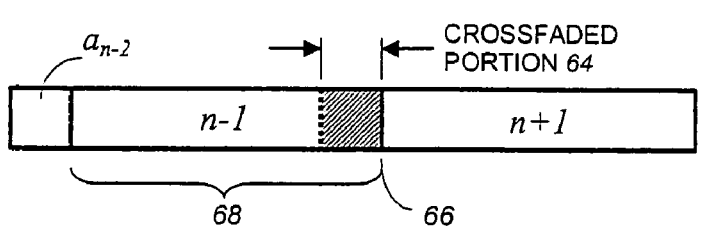
FIG. 6b

FRAME-BASED AUDIO TRANSMISSION/STORAGE WITH OVERLAP TO FACILITATE SMOOTH CROSSFADING

FIELD OF THE INVENTION

The present invention is related to audio signal processing in which audio information streams are arranged in frames of information. In particular, the present invention is related to improving the quality of audio information streams formed by splicing frame-based audio information streams.

BACKGROUND OF THE INVENTION

Framed Audio

The use of digital audio has tended to make it more difficult to edit audio material without creating audible artifacts. This has occurred in part because digital audio is frequently packaged in frames or blocks of digital samples that must be processed together. Many audio transmission systems convert frames of signal samples into frames of packaged or encoded information that must be unpacked or decoded to recover a replica of the original signal. At a minimum, an edit of the audio signal must be done at a frame boundary; otherwise, audio information represented by the remaining partial frame cannot be properly recovered.

Throughout the remainder of this discussion, the term "frame" refers to a group or block of one or more consecutive digital audio samples, and the term "stream" refers to a sequence of frames. The term "frame boundary" denotes the division between a pair of sequential adjacent frames. Also, terms such as "packing" and "packaging" refer to various methods and devices for encapsulating frames of audio (for example for transmission or storage) and terms such as "packed" refer to the results of these methods. Packaging may include any of the following methods: addition of non audio information (common referred to as metadata), time compression, and removal of information irrelevancy or redundancy (commonly referred to as data compression). Finally the term "fade" refers to the application of a modulation envelope to a sequence of audio samples.

Editing of packaged audio is becoming increasingly important as audio is often packaged with other "frame" based multimedia content, such as video. In such situations it is advantageous to edit both the audio and video at a common interval or frame boundary.

Typically, the length of a frame is fixed for a given application. For example when dividing 48 kHz sample rate audio into 24 framess per second (the common frame rate for film projection), the length of each frame is 2002 samples.

In some situations it is necessary to vary the length of frames with respect to each other. One example is when dividing 48 kHz audio into the NTSC television frame rate of 29.97 frames per second, which requires a non-integral frame length of 1601.6 samples per frame. This situation can be accommodated either by arranging the audio into super-frames (that have an integral number of samples), or by allowing the audio frame size to vary slightly, frame to frame. Audio frames in the present invention may be either of fixed or variable length.

The editing or manipulation of sequences of frames, often in streams, can take various forms including: removing frames or sequences of frames from a stream (for example removing a scene from a television program to shorten its length), inserting frames or sequences of frames into a stream (for example inserting a scene into a movie), and concatenating frames or streams to make a larger stream.

Spectral Splatter

Editing of audio information can create discontinuities in the audio signal that result in spurious spectral components or audible artifacts, often characterized as spectral splatter, "clicks" or "thumps." Thus when streams are edited, the audio signal reconstructed by unpacking the sequence of frames may contain audible artifacts at locations corresponding to the frame boundaries where edits occurred.

The spectral splatter can be minimized by smoothly fading down the audio signal to near silence prior to the splice location and smoothly fading back up again after the splice boundary. This is often referred to as a "V fade." Although a V fade minimizes audible clicks, an audible dip in the audio signal level may become apparent when there is significant signal level either side of the splice location. This audible level dip may be just as undesirable as the audible spectral splatter.

SUMMARY OF THE INVENTION

According to a system aspect of the invention, a method for processing one or more ordered sequences of PCM audio frames, comprises appending to the beginning of frames, a segment of PCM audio that is substantially a replica of PCM audio in the end of the next preceding frame in an ordered sequence, or, to the end of frames, a segment of PCM audio that is substantially a replica of PCM audio in the beginning of the next following frame in an ordered sequence, whereby modified frames are produced, maintaining for the modified frames a sequential order that is the same as the order of one of the one or more ordered sequences of the PCM audio frames or assigning a further sequential order to the modified frames, which sequential order is different from the order of one of the one or more ordered sequences of PCM audio frames, whereby the further sequential order has at least one discontinuity in its order with respect to the order of one of the one or more ordered sequences of PCM audio frames, fading up the PCM audio appended to the beginning of the modified frame following a discontinuity and fading down the PCM audio in the end of the modified frame preceding a discontinuity when segments are appended to the beginning of frames or fading down the PCM audio appended to the end of the modified frame preceding a discontinuity and fading up the PCM audio in the beginning of the modified frame following a discontinuity when segments are appended to the end of frames, overlapping and additively combining the faded-up and faded-down PCM audio preceding and following a discontinuity in the sequence of faded-up and faded-down modified frames, and removing the segment of PCM audio appended to a modified frame in sequential pairs of modified frames and joining the resulting PCM audio frames when the sequential pair of modified frames does not contain a discontinuity following or preceding the appendage, whereby a further ordered sequence of PCM audio frames is provided having the same order as one of the one or more ordered sequences of PCM audio frames or having one or more discontinuities between sequences of PCM audio frames, each of the sequences having the same order as one of the one or more ordered sequences of PCM audio frames or a portion thereof, discontinuities having an associated PCM audio crossfaded portion where the faded-up and faded-down PCM audio is overlapped and combined.

According to another system aspect of the invention, a method for processing one or more ordered sequences of PCM audio frames, comprises appending to the beginning of frames, a segment of PCM audio that is substantially a replica of PCM audio in the end of the next preceding frame in an ordered sequence, or, to the end of frames, a segment of PCM audio that is substantially a replica of PCM audio in the beginning of the next following frame in an ordered sequence, whereby modified frames are produced, fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, maintaining for the modified frames or for the faded-up and faded-down modified frames a sequential order that is the same as the order of one of the one or more ordered sequences of the PCM audio frames or assigning a further sequential order to the modified frames or to the faded-up and faded-down modified frames, which sequence is different from the order of one of the one or more ordered sequences of PCM audio frames, whereby the further sequential order has at least one discontinuity in its order with respect to the order of one of the one or more ordered sequences of PCM audio frames, and overlapping and additively combining sequential pairs of faded-up and faded-down PCM audio in the sequence of faded-up and faded-down modified frames having a sequential order that is the same as the order of one of the one or more ordered sequences of the PCM audio frames or having the further sequential order, whereby a further ordered sequence of PCM audio frames is provided having the same order as one of the one or more ordered sequences of PCM audio frames or having one or more discontinuities between sequences of PCM audio frames, each of the sequences having the same order as one of the one or more ordered sequences of PCM audio frames or a portion thereof, consecutive pairs in the further order of PCM audio frames having an associated PCM audio crossfaded portion where the faded-up and faded-down PCM audio is overlapped and combined.

According to a transmitter aspect of the present invention, A method for processing one or more ordered sequences of PCM audio frames, comprises appending only to the beginning of frames, a segment of PCM audio that is substantially a replica of PCM audio in the end of the next preceding frame in an ordered sequence, or, to the end of frames, a segment of PCM audio that is substantially a replica of PCM audio in the beginning of the next following frame in an ordered sequence, whereby modified frames are produced, and transmitting, storing, or transmitting and storing the modified frames.

According to another transmitter aspect of the invention, a method for processing one or more ordered sequences of PCM audio frames, comprises appending only to the beginning of frames, a segment of PCM audio that is substantially a replica of PCM audio in the end of the next preceding frame in an ordered sequence, or, to the end of frames, a segment of PCM audio that is substantially a replica of PCM audio in the beginning of the next following frame in an ordered sequence, whereby modified frames are produced, fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, and transmitting, storing, or transmitting and storing the faded-up and faded-down modified frames.

According to a receiver aspect of the present invention, a method for processing PCM audio data, comprises receiving modified PCM audio frames, wherein the modified frames were produced by processing one or more ordered sequences of PCM audio frames by appending to the beginning of frames, a segment of PCM audio that is substantially a replica of PCM audio in the end of the next preceding frame in an ordered sequence, or, to the end of frames, a segment of PCM audio that is substantially a replica of PCM audio in the beginning of the next following frame in an ordered sequence, maintaining for the modified frames a sequential order that is the same as the order of one of the one or more ordered sequences of the PCM audio frames or assigning a further sequential order to the modified frames, which sequential order is different from the order of one of the one or more ordered sequences of PCM audio frames, whereby the further sequential order has at least one discontinuity in its order with respect to the order of one of the one or more ordered sequences of PCM audio frames, fading up the PCM audio appended to the beginning of the modified frame following a discontinuity and fading down the PCM audio in the end of the modified frame preceding a discontinuity when segments are appended to the beginning of frames or fading down the PCM audio appended to the end of the modified frame preceding a discontinuity and fading up the PCM audio in the beginning of the modified frame following a discontinuity when segments are appended to the end of frames, overlapping and additively combining the faded-up and faded-down PCM audio preceding and following a discontinuity in the sequence of faded-up and faded-down modified frames, and removing the segment of PCM audio appended to a modified frame in sequential pairs of modified frames and joining the resulting PCM audio frames when the sequential pair of modified frames does not contain a discontinuity following or preceding the appendage, whereby a further ordered sequence of PCM audio frames is provided having the same order as one of the one or more ordered sequences of PCM audio frames or having one or more discontinuities between sequences of PCM audio frames, each of the sequences having the same order as one of the one or more ordered sequences of PCM audio frames or a portion thereof, discontinuities having an associated PCM audio crossfaded portion where the faded-up and faded-down PCM audio is overlapped and combined.

According to another receiver method of the present invention, a method for processing PCM audio data, comprises receiving modified PCM audio frames, wherein the modified frames were produced by processing one or more ordered sequences of PCM audio frames by appending to the beginning of frames, a segment of PCM audio that is substantially a replica of PCM audio in the end of the next preceding frame in an ordered sequence, or, to the end of frames, a segment of PCM audio that is substantially a replica of PCM audio in the beginning of the next following frame in an ordered sequence, and have a sequential order that is the same as the order of one of the one or more ordered sequences of the PCM audio frames or have a further sequential order, which sequential order is different from the order of one of the one or more ordered sequences of PCM audio frames, whereby the further sequential order has at least one discontinuity in its order with respect to the order of one of the one or more ordered sequences of PCM audio frames, fading up the PCM audio appended to the beginning of the modified frame following a discontinuity and fading down the PCM audio in the end of the modified frame preceding a discontinuity when segments are appended to the beginning of frames or fading down the PCM audio appended to the end of the modified frame preceding a discontinuity and fading up the PCM audio in the beginning of the modified frame following a discontinuity when segments are appended to the end of frames, overlapping and additively combining the faded-up and faded-down PCM audio preceding and following a discontinuity in the sequence of faded-up and faded-down modified frames, and removing the segment of PCM audio appended to a modified frame in sequential pairs of modified frames and joining the resulting PCM audio frames when the sequential pair of modified frames does not contain a discontinuity following or preceding the appendage, whereby a further ordered sequence of PCM audio frames is provided having the same order as one of the one or more ordered sequences of PCM audio frames or having one or more discontinuities between sequences of PCM audio frames, each of the sequences having the same order as one of the one or more ordered sequences of PCM audio frames or a portion thereof, discontinuities having an associated PCM audio crossfaded portion where the faded-up and faded-down PCM audio is overlapped and combined.

According to another receiver method of the present invention, a method for processing PCM audio, comprises receiving faded-up and faded-down modified PCM audio frames, wherein the faded-up and faded-down modified frames were produced by processing one or more ordered sequences of PCM audio frames by appending to the beginning of frames, a segment of PCM audio that is substantially a replica of PCM audio in the end of the next preceding frame in an ordered sequence, or, to the end of frames, a segment of PCM audio that is substantially a replica of PCM audio in the beginning of the next following frame in an ordered sequence, and fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, maintaining for the faded-up and faded-down modified frames a sequential order that is the same as the order of one of the one or more ordered sequences of the PCM audio frames or assigning a further sequential order to the faded-up and faded-down modified frames, which sequence is different from the order of one of the one or more ordered sequences of PCM audio frames, whereby the further sequential order has at least one discontinuity in its order with respect to the order of one of the one or more ordered sequences of PCM audio frames, and overlapping and additively combining sequential pairs of faded-up and faded-down PCM audio in the sequence of faded-up and faded-down modified frames, whereby a further ordered sequence of PCM audio frames is provided in which consecutive pairs of PCM audio frames have a PCM audio crossfaded portion where the faded-up and faded-down PCM audio is overlapped and combined.

According to another receiver method of the present invention, a method for processing PCM audio, comprises receiving faded-up and faded-down modified PCM audio frames, wherein the faded-up and faded-down modified frames were produced by processing one or more ordered sequences of PCM audio frames by appending to the beginning of frames, a segment of PCM audio that is substantially a replica of PCM audio in the end of the next preceding frame in an ordered sequence, or, to the end of frames, a segment of PCM audio that is substantially a replica of PCM audio in the beginning of the next following frame in an ordered sequence, and fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, wherein the faded-up and faded-down modified PCM audio frames have a sequential order that is the same as the order of one of the one or more ordered sequences of the PCM audio frames or have a further sequential order, which sequential order is different from the order of one of the one or more ordered sequences of PCM audio frames, whereby the further sequential order has at least one discontinuity in its order with respect to the order of one of the one or more ordered sequences of PCM audio frames, and overlapping and additively combining sequential pairs of faded-up and faded-down PCM audio in the sequence of faded-up and faded-down modified frames, whereby a further ordered sequence of PCM audio frames is provided in which consecutive pairs of PCM audio frames have a PCM audio crossfaded portion where the faded-up and faded-down PCM audio is overlapped and combined.

According to another receiver method of the present invention, a method for processing PCM audio, comprises receiving modified PCM audio frames, wherein the modified frames were produced by processing one or more ordered sequences of PCM audio frames by appending to the beginning of frames, a segment of PCM audio that is substantially a replica of PCM audio in the end of the next preceding frame in an ordered sequence, or, to the end of frames, a segment of PCM audio that is substantially a replica of PCM audio in the beginning of the next following frame in an ordered sequence, fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, maintaining for the modified frames or for the faded-up and faded-down modified frames a sequential order that is the same as the order of one of the one or more ordered sequences of the PCM audio frames or assigning a further sequential order to the modified frames or to the faded-up and faded-down modified frames, which sequence is different from the order of one of the one or more ordered sequences of PCM audio frames, whereby the further sequential order has at least one discontinuity in its order with respect to the order of one of the one or more ordered sequences of PCM audio frames, and overlapping and additively combining sequential pairs of faded-up and faded-down PCM audio in the sequence of faded-up and faded-down modified frames, having a sequential order that is the same as the order of one of the one or more ordered sequences of the PCM audio frames or having the further sequential order, whereby a further ordered sequence of PCM audio frames is provided in which consecutive pairs of PCM audio frames have a PCM audio crossfaded portion where the faded-up and faded-down PCM audio is overlapped and combined.

According to another receiver method of the present invention, a method for processing PCM audio, comprises receiving modified PCM audio frames, wherein the modified frames were produced by processing one or more ordered sequences of PCM audio frames by appending to the beginning of frames, a segment of PCM audio that is substantially a replica of PCM audio in the end of the next preceding frame in an ordered sequence, or, to the end of frames, a segment of PCM audio that is substantially a replica of PCM audio in the beginning of the next following frame in an ordered sequence, and have a sequential order that is the same as the order of one of the one or more ordered sequences of the PCM audio frames or have a further sequential order, which sequential order is different from the order of one of the one or more ordered sequences of PCM audio frames, whereby the further sequential order has at least one discontinuity in its order with respect to the order of one of the one or more ordered sequences of PCM audio frames, fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, and overlapping and additively combining sequential pairs of faded-up and faded-down PCM audio in the sequence of faded-up and faded-down modified frames, whereby a further ordered sequence of PCM audio frames is provided in which consecutive pairs of PCM audio frames have a PCM audio crossfaded portion where the faded-up and faded-down PCM audio is overlapped and combined.

BRIEF DESCRIPTION OF THE DRAWINGS

FIG. 2 is a time-domain representation.

FIG. 3 is a space-domain representation.

FIG. 4 is an idealized, schematic and conceptual example of a modified PCM audio frame, consisting of a PCM audio frame with an appendage at its beginning, the appendage being a replica of the end of the next preceding frame.

FIG. 5 is an idealized, schematic and conceptual example of a modified PCM audio frame, consisting of a PCM audio frame with an appendage at its end, the appendage being a replica of the beginning of the next following frame.

FIG. 6a is an idealized, schematic and conceptual example of two modified frames with the appendage at their beginning that have a discontinuity with respect to one another. That is, they do not have the same sequential order as frames applied to the system.

FIG. 6b is an idealized, schematic and conceptual example of the two modified frames of FIG. 6a, overlapped and combined so as to have a crossfaded portion in one of the modified frames.

FIG. 7a is an idealized, schematic and conceptual example of two modified frames with the appendage at their end that have a discontinuity with respect to one another. That is, they do not have the same sequential order as frames applied to the system.

DETAILED DESCRIPTION OF THE PREFERRED EMBODIMENTS

Figure 1:
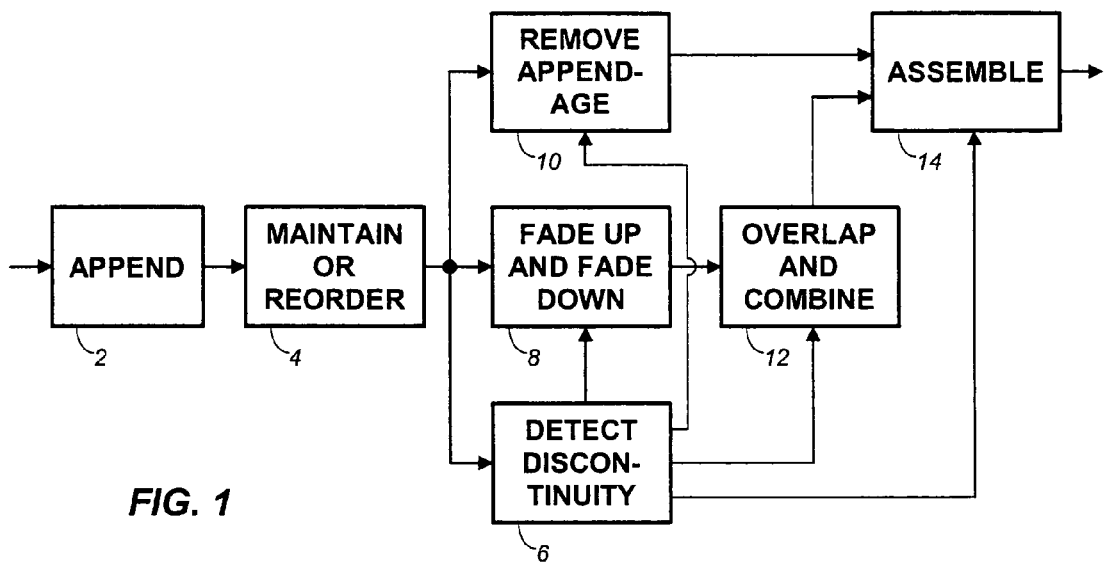
FIG. 1 is a functional block diagram showing an overall system employing aspects of the present invention according to a first approach.

FIG. 1 is a functional block diagram showing an overall system employing aspects of the present invention according to a first approach. The system need not be located all at the same place. As described below, transmission, storage, or a combination of transmission and storage may be employed to allow certain separations of the system elements. In addition, as described below, either or both of time compression/decompression and data coding may be employed in connection with transmission, storage, or a combination of transmission and storage.

Referring to FIG. 1, one or more ordered sequences of PCM audio frames (of fixed or variable length) that may include not only PCM audio samples but also other information and/or metadata are received by an "append" function or device 2. In this and other embodiments of the present invention, the PCM audio frames are an "ordered sequence" in the sense that they have a notional sequential order, typically indicated by an assigned frame number or other suitable sequence identifier. Also, in this and other embodiments, an ordered sequence may be received, for example, by append 2 either in a stream of PCM audio frames (in the manner of FIG. 2) or it may be received from memory space in which the ordered sequence of PCM audio frames are stored (in the manner of FIG. 3), in which case, the PCM audio frames may be randomly stored, their order being indicated only by a unique identifier such as a frame number.

Figure 2:
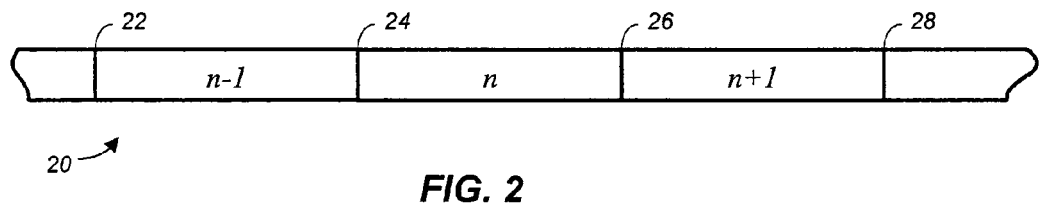
FIG. 2 is an idealized, schematic and conceptual example of a portion of a stream of digital audio samples.

In FIG. 2, an example of a portion of a stream 20 of digital audio samples is shown as including three PCM audio frames n−1, n and n+1. The frames have an ordered sequence and are in that sequence within the stream. Reference numerals 22, 24, 26 and 28 indicate frame boundaries.

Figure 3:
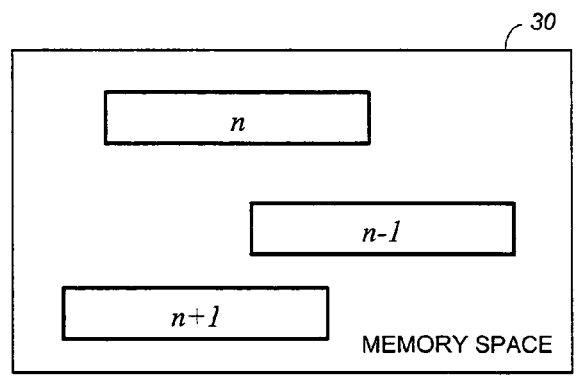
FIG. 3 is is an idealized, schematic and conceptual example of three audio frames stored randomly in a memory space.

In FIG. 3, the three PCM audio frames n−1, n and n+1 are shown stored randomly in a memory space 30. In the example of FIG. 3, although the frames may be randomly located in memory, they also have an ordered sequence as indicated by their frame numbers.

In FIGS. 2 and 3 and other figures, the PCM audio frames are shown idealized, schematically and not to scale for the purposes of explaining the present invention and its various aspects; individual audio samples are not shown. FIG. 2 is a time-domain representation in which the horizontal scale indicates time. FIG. 3 is a space-domain representation in which area indicates the amount of data.

In practical environments of particular interest to the present invention, an ordered sequence of PCM audio frames may be received in a stream that has frame boundaries coincident with the frame boundaries of a related video signal stream. Digital audio is often packaged with other "frame" based multimedia content, such as video. In such situations, it is advantageous to edit both the audio and video at a common frame boundary.

Referring again to FIG. 1, append 2 produces modified PCM audio frames by appending to the beginning of each received frame a segment of PCM audio that is substantially a replica of PCM audio in the end of the next preceding frame in the ordered sequence of received frames. (It will be understood that "a segment of PCM audio" and similar language is a shorthand expression that refers to a segment of PCM audio samples.) Preferably and advantageously, for reasons set forth below, a segment of audio is appended only to one end of each received frame. For example, as shown in FIG. 4, a modified PCM audio frame 40 is shown in which frame n, has an appendage $a_{n-1}$ at its beginning, an appendage that is a replica of the end of the next preceding frame n−1. When there is no next preceding frame, the appendage may be filled with any audio information, the most appropriate being silence.

An advantage of appending at the beginning of frames is that when splicing together the end of one stream with the start of another, the audio information from the start of the second stream is reconstructed at full level. That is, the audio information is not faded up, as would the case if audio is appended to the end of frames, as discussed below in connection with the description of FIG. 5. For example, if the end of a television advertisement was spliced together with the start of a television program, it is more desirable that the end of the television advertisement be faded down prior to the start of the program, rather than have the start of the program fade up (with the end of the advertisement unchanged).

Alternatively, append 2 produces modified PCM audio frames by appending to the end of each received frame a segment of PCM audio that is substantially a replica of PCM audio in the beginning of the next following frame in the ordered sequence of received frames. For example, as shown in FIG. 5, a modified PCM audio frame 50 is shown in which frame n has an appendage $a_{n+1}$ at its end, a replica of the beginning of the next following frame n+1. When there is no next following frame, the appendage may be filled with any audio information, the most appropriate being silence.

An advantage of appending at the end of frames is that crossfaded portions occur in alignment with the frame-to-frame cross fading of Dolby E perceptually encoded audio, thus facilitating the co-editing of PCM audio and Dolby E encoded audio. Dolby and Dolby E are trademarks of Dolby Laboratories Licensing Corporation.

When modified PCM audio frames are packed for storage or transmission, as discussed below, the resulting information will have a higher data rate than the input PCM audio frames. In general, an increase in data rate is not desirable, however, in accordance with the various aspects of the present invention, the benefits of smooth crossfading and reduced artifacts are preferable at the expense of data rate. As mentioned below, data compression may be employed to mitigate such data rate increases.

The modified PCM audio frames are applied to a 'maintain or reorder" function or device 4 that may either maintain for the modified PCM frames a sequential order that is the same as the order of one of the one or more ordered sequences of the PCM audio frames or assign a further sequential order to the modified frames, which sequential order is different from the order of one of the one or more ordered sequences of PCM audio frames, in which case, the further sequential order has at least one discontinuity in its order with respect to the order of one of the one or more ordered sequences of PCM audio frames. For example, if there is one ordered sequence of audio frames applied to the system of FIG. 1, having, for example, frames n, n+1, n+2, n+3, and n+4, that same ordered sequence might be maintained. Alternatively, as one example, a frame might be removed to produce a further ordered sequence n, n+1, n+3, n+4, which has a discontinuity between frames n+1 and n+3. Another example is to rearrange the frames to produce a further ordered sequence n+3, n+4, n, n+1, n+2, which has a discontinuity between frames n+4 and n. Yet a further example is to apply two ordered sequences of audio frames to the system of FIG. 1: a first ordered sequence n, n+1, n+2, n+3 and a second ordered sequence n+20, n+21, n+22, n+23. The two ordered sequences may be joined together to produce a further ordered sequence n, n+1, n+2, n+3, n+20, n+21, n+22, n+23, which has a discontinuity between frames n+3 and n+20.

A "detect discontinuity" function or device 6 receives the modified PCM audio frames that may or may not have one or more discontinuities. Function or device 6 detects discontinuities and, upon detection of a discontinuity, provides a suitable signal or indication thereof to other functions or devices as next described.

A "fade up and fade down" function or device 8 also receives the modified PCM audio frames that may or may not have one or more discontinuities. When append 2 appends segments to the beginning of frames and a discontinuity is detected by "detect discontinuity" function or device 6, function or device 8 fades up the PCM audio appended to the beginning of the modified frame following the discontinuity and fades down the PCM audio in the end of the modified frame preceding the discontinuity. This is explained in connection with the example of FIG. 6a. When append 2 appends segments to the end of frames and a discontinuity is detected, function or device 8 fades down the PCM audio appended to the end of the modified frame preceding the discontinuity and fades up the PCM audio in the beginning of the modified frame following the discontinuity. This is explained in connection with the example of FIG. 7a. The length of the faded-up and faded-down portions of modified frames should be substantially the same and criteria for selecting a suitable length are discussed below.

The "fade up and fade down" function or device may be separate functions or devices and may be separated such that one function or device performs fade up and another (perhaps remotely located from the other) performs fade down, or vice-versa.

FIG. 6a shows an example of two modified frames that have a discontinuity with respect to one another. That is, they do not have the same sequential order as frames applied to the system. The maintain or reorder function or device 4 has produced a further sequence that includes a discontinuity with respect to the original sequence. Upon detection (as by function or device 6) of a discontinuity between sequential frames from device or function 4, the fade-up and fade-down function or device operates on the pair of discontinuous frames. In FIG. 6a, a faded-up appendage $a_n'$ is shown appended to the beginning of the $(n+1)^{st}$ frame to provide a frame with appendage 60. The fade up is shown as a linear fade up. Other fade-up functions are possible as discussed below. Frame n−1 is the next previous frame once removed. Its end is faded down and an appendage $a_{n-2}$, a replica of a segment of the end of the next previous frame n−2, is appended to its beginning to provide a faded frame with appendage 62. The fade down is shown as a linear fade down. Other fade-down functions are possible as discussed below. The fade-up and fade-down functions employed in the present invention according to a first approach may be, but need not be, complementary. Inasmuch as fade up and fade down only occur when there is a splice, full complementarity is not required. Techniques for crossfading and achieving complementarity are discussed below.

FIG. 7a differs from FIG. 6a in that it shows an example of two modified PCM audio frames that have a discontinuity with respect to one another for the case in which the appendage is appended to the end of the frames.

In FIG. 7a, the faded-down appendage $a_n'$ is shown appended to the end of the $(n-1)^{st}$ frame to provide a frame with faded appendage 70. The fade down is shown as a linear fade down. Other fade-down functions are possible as discussed below. Frame n+1 is the next following frame once removed, in which its beginning is faded up and to which an appendage $a_{n+2}$, a replica of a segment of the beginning of the next following frame n+2, is appended to provide a faded frame with appendage 72. The fade up is shown as a linear fade up. Other fade-up functions are possible as discussed below. As mentioned above, the fade-up and fade-down functions employed in the present invention according to a first approach may be, but need not be, complementary.

Modified PCM audio frames that are faded up and faded down at discontinuities, as in FIGS. 6a and 7a, are applied to an "overlap and combine" function or device 12 that overlaps and additively combines the pair of faded-up and faded-down segments of PCM audio before and after a discontinuity, when a discontinuity is detected by "detect discontinuity" function or device 6, to provide a crossfaded portion where the faded-up and faded-down segments overlap and combine.

The example of FIG. 6a is shown overlapped and combined in FIG. 6b so as to have a crossfaded portion 64 in one of the modified frames. In this example, the overlapping and combining may ultimately result, at the system output, in a concatenation of formerly non-sequential frames n−1 and n+1 at a frame boundary 66. The crossfaded portion provides a smooth crossfade from the PCM audio in frame n−1 to that in frame n+1. The crossfade is between the audio in the end of frame n−1 and the audio in the end of frame n, just preceding frame n+1 and occurs within the end of frame n−1. An appendage such as appendage $a_{n-2}$, appended to the beginning of frame n−1, either may be used for another crossfade, if it is associated with another discontinuity, or it may be removed, if it is not associated with another discontinuity, as described below. Frame 68, which includes audio from frame n−1 and the crossfaded portion 64, but excludes appendage $a_{n-2}$, preferably is used as a building block by an "assemble" function or device 14 to generate the system output, namely a further ordered sequence of PCM audio frames, as is described below.

Figure 7B:
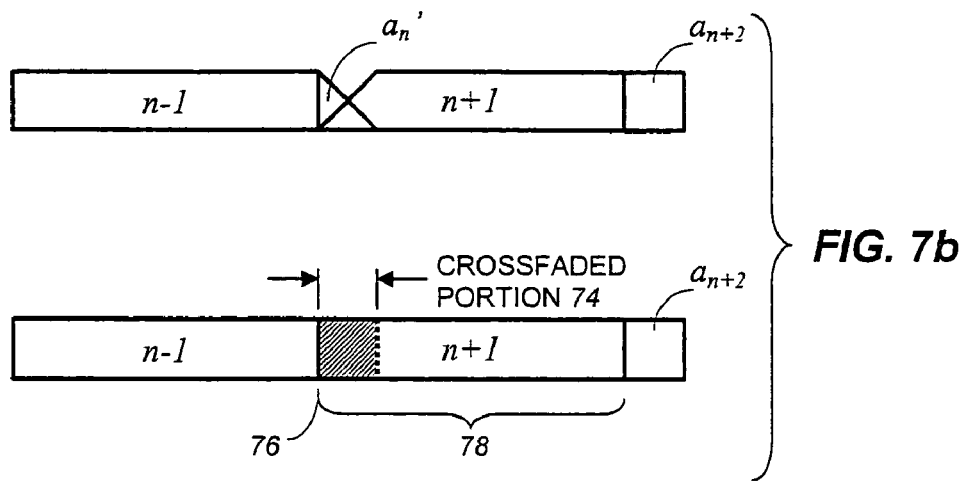
FIG. 7b is an idealized, schematic and conceptual example of the two modified frames of FIG. 7a, overlapped and combined so as to have a crossfaded portion in one of the modified frames.

Similarly, the example of FIG. 7a is shown overlapped and combined in FIG. 7b so as to have a crossfaded portion 74 in one of the modified PCM audio frames. In addition, in this example, the overlapping and combining may ultimately result, at the system output, in a concatenation of formerly non-sequential frames n−1 and n+1 at a frame boundary 76.

The crossfaded portion provides a smooth crossfade from the PCM audio in frame n−1 to that in frame n+1. The crossfade is between the audio in the beginning of frame n, just after frame n−1, and the audio in the beginning of frame n+1 and occurs within frame n+1. An appendage such as appendage $a_{n+2}$, appended to the end of frame n+1, either may be used for another crossfade, if it is associated with another discontinuity, or it may be removed, if it is not associated with another crossfade, as described below. Frame 78, which includes audio from frame n+1 and the crossfaded portion 74, but excludes appendage $a_{n+2}$, preferably is used as a building block by assemble 14 to generate the system output, namely a further ordered sequence of PCM audio frames, as is described below.

Figure 8:
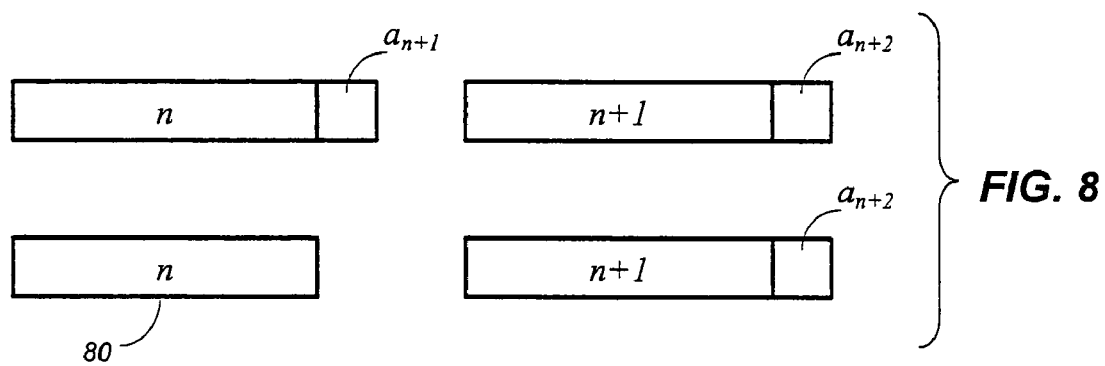
FIG. 8 is an idealized, schematic and conceptual example of a pair of modified frames having the same sequence as frames applied to the system. The figure shows conceptually the removal of the appendage from the modified frame between the sequential frames.

A "remove appendage" function or device 10 also receives the modified PCM audio frames that may or may not have one or more discontinuities. When a sequential pair of modified frames does not contain a discontinuity following or preceding the appendage (thus, no discontinuity is detected by detect discontinuity 6), function or device 10 removes the appendage in one of the modified frames of the pair. For example, in FIG. 8, a pair of modified frames having the same sequence (n, n+1) as frames applied to the system of FIG. 1 is shown. Function or device 10 removes the appendage $a_{n+1}$ from the modified frame having frame n to provide the result, frame 80, shown in FIG. 8. An appendage, such as appendage $a_{n+2}$, appended to the next sequential modified frame in this example, either is used for a crossfade, if it is associated with a discontinuity, or also is removed, if it is not. Frame 80, which is the same as a PCM frame applied to the system of FIG. 1, preferably is used also a building block by assemble 14 to generate the system output.

As a result of processing by "fade up and fade down" 8 and "overlap and combine" 12, and by "remove appendage" 10, PCM audio frames having crossfades (such as frame 68 of FIG. 6b and frame 78 of FIG. 7b) and PCM audio frames corresponding to PCM audio frames applied to the system (such as frame 80) are produced. Such PCM audio frames are selected and assembled into a further ordered sequence of PCM audio frames by an "assemble" function or device 14. Thus, a further ordered sequence of PCM audio frames is provided at the system output having the same order as one of the one or more ordered sequences of PCM audio frames or having one or more discontinuities between sequences of PCM audio frames, each of the sequences having the same order as one of the one or more ordered sequences of PCM audio frames or a portion thereof, discontinuities having an associated PCM audio crossfaded portion where the faded-up and faded-down PCM audio is overlapped and combined. In other words, the output signal may be equivalent or identical to the input signal—the output signal differs from the input signal when a splice occurs and crossfading is performed.

Figure 9A:
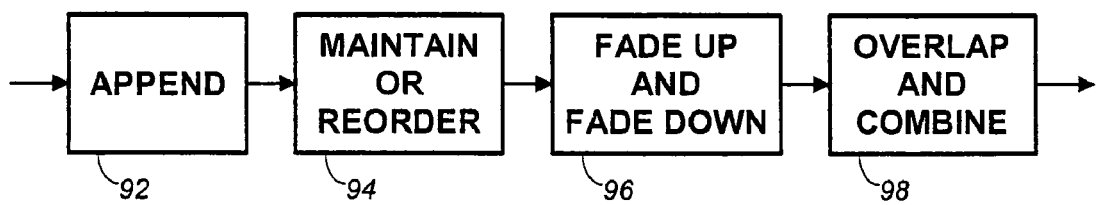
FIG. 9a is a functional block diagram showing an overall system employing aspects of the present invention according to first variation of a second approach.
Figure 9B:
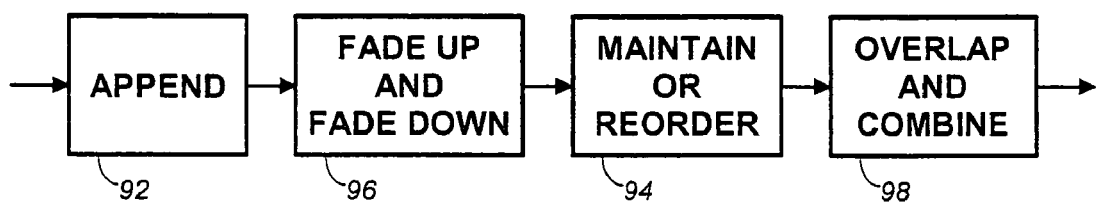
FIG. 9b is is a functional block diagram showing an overall system employing aspects of the present invention according to a second variation of a second approach.

FIGS. 9a and 9b are functional block diagrams showing an overall system employing aspects of the present invention according to a second approach. According to this second approach, the start and end of every modified frame is faded (that is the fade up and fade down modulation envelopes are applied) and that every faded modified frame is overlapped and combined to provide a crossfade. Advantages of this second approach include the elimination of any need to determine the presence of discontinuities in the modified frame sequences, and secondly that less processing is required in a receiver (see below regarding a "receiver")—only additions (no multiplications) are required in a receiver. However, a disadvantage of this approach is that even if the modulation envelopes used are complementary, that is the fade down and fade up envelopes sum to unity, rounding errors may exist in the reconstructed audio in the crossfaded region inasmuch as many computing devices multiplication introduces rounding errors. In order to overcome this disadvantage, a subtractive method of providing complementary fade-up and fade-down modulation envelopes is described below.

As in the case of the FIG. 1 approach, the system of FIGS. 9a and 9b need not be located all at the same place. As described below, transmission, storage, or a combination of transmission and storage may be employed to allow certain separations of the system elements. In addition, as described below, either or both of time compression/decompression and data coding may be employed in connection with transmission, storage, or a combination of transmission and storage.

The FIGS. 9a and 9b approach may be implemented with a "maintain or reorder" function or device 94 and a "fade up and fade down" function or device 96 in either order with respect to each other. FIG. 9a shows one option, in which the "maintain or reorder" function or device 94 precedes the fade-up and fade-down function or device 96. FIG. 9b shows the other option, in which the "fade up and fade down" function or device 96 precedes the "maintain or reorder" function or device 94. In both options, one or more ordered sequences of PCM audio frames that may include not only PCM audio samples but also other information and/or metadata are received by an "append" function or device 92, which function or device may be the same as in the FIG. 1 approach. As in the FIG. 1 approach, the PCM audio frames are an "ordered sequence" in the sense that they have a notional sequential order, typically indicated by an assigned frame number or other suitable sequence identifier. Also, as in the FIG. 1 approach, an ordered sequence may be received, for example, by append 92 either in a stream of PCM audio frames (in the manner of FIG. 2) or it may be received from memory space in which the ordered sequence of PCM audio frames are stored (in the manner of FIG. 3), in which case, the PCM audio frames may be randomly stored, their order being indicated only by a unique identifier such as a frame number. As in the FIG. 1 approach, the audio frames may be of fixed or variable length.

As in the case of the FIG. 1 approach, in practical environments of particular interest to the present invention, an ordered sequence of PCM audio frames may be received in a stream that has frame boundaries coincident with the frame boundaries of a related video signal stream. Digital audio is often packaged with other "frame" based multimedia content, such as video. In such situations, it is advantageous to edit both the audio and video at a common frame boundary.

Referring again to FIGS. 9a and 9b, append 92 operates in the same way as append 2 of FIG. 1, namely, it produces modified PCM audio frames by appending to the beginning of each received frame a segment of PCM audio that is substantially a replica of PCM audio in the end of the next preceding frame in the ordered sequence of received frames, or by appending to the end of each received frame a segment of PCM audio that is substantially a replica of PCM audio in the beginning of the next following frame in the ordered sequence of received frames. The examples of FIG. 4 and FIG. 5 also apply to the modified frames produced by append 92 of FIGS. 9a and 9b.

According to the FIG. 9a option, the modified audio frames are applied to a 'maintain or reorder" function or device 94 that may either maintain for the modified frames a sequential order that is the same as the order of one of the one or more ordered sequences of the PCM audio frames or assign a further sequential order to the modified frames, which sequential order is different from the order of one of the one or more ordered sequences of PCM audio frames, in which case, the further sequential order has at least one discontinuity in its order with respect to the order of one of the one or more ordered sequences of PCM audio frames. Function or device 94 operates in the same manner as the "maintain or reorder" function or device 4 of FIG. 1. For example, as in FIG. 1, if there is one ordered sequence of audio frames applied to the system of FIG. 9*a*, having, for example, frames n, n+1, n+2, n+3, and n+4, that same ordered sequence might be maintained. Alternatively, as one example, a frame might be removed to produce a further ordered sequence n, n+1, n+3, n+4, which has a discontinuity between frames n+1 and n+3. Another example is to rearrange the frames to produce a further ordered sequence n+3, n+4, n, n+1, n+2, which has a discontinuity between frames n+4 and n. Yet a further example is to apply two ordered sequences of audio frames to the system of FIG. 9*a*: a first ordered sequence n, n+1, n+2, n+3 and a second ordered sequence n+20, n+21, n+22, n+23. The two ordered sequences may be joined together to produce a further ordered sequence n, n+1, n+2, n+3, n+20, n+21, n+22, n+23, which has a discontinuity between frames n+3 and n+20.

Still referring to the FIG. 9*a* option, a "fade up and fade down" function or device 96 also receives the modified audio frames that may or may not have one or more discontinuities. When append 92 appends segments to the beginning of frames, function or device 96 fades up the PCM audio appended to the beginning of modified frames (not just those following a discontinuity) and fades down the PCM audio in the end of modified frames (not just those preceding a discontinuity). Thus, unlike the "fade up and fade down" function or device 8 of FIG. 1, the fade-up and fade-down action of device or function 96 is not limited to acting on modified frames before and after a discontinuity, but acts whether or not there is a discontinuity. This is explained in connection with the example of FIG. 10*a*. When append 92 appends segments to the end of frames, function or device 96 fades down the PCM audio appended to the end of the modified frame and fades up the PCM audio in the beginning of the modified frame. This is explained in connection with the example of FIG. 11*a*. The length of the faded-up and faded-down portions of modified frames should be substantially the same and criteria for selecting a suitable length are discussed below.

The "fade up and fade down" function or device may be separate functions or devices and may be separated such that one function or device performs fade up and another (perhaps remotely located from the other) performs fade down, or vice-versa.

Figure 10A:
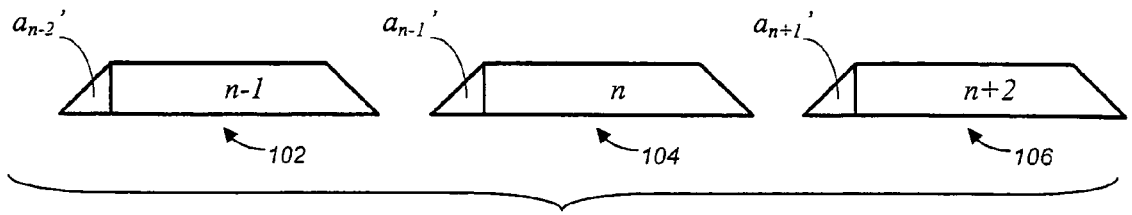
FIG. 10a is an idealized, schematic and conceptual example of three modified frames with the appendage at their beginning in which there is a discontinuity between one consecutive pair but not between the other.

FIG. 10*a* shows an example of three modified frames, one consecutive pair has no discontinuity and another pair does have a discontinuity. That is, one pair has the same sequential order as frames applied to the system and the other pair does not. The maintain or reorder function or device 94 has produced a further sequence that includes a discontinuity with respect to the original sequence. The fade-up and fade-down function or device operates on every frame whether or not a pair is discontinuous. In FIG. 10*a*, a faded-up appendage $a_{n-2}'$ is shown appended to the beginning of the $(n-1)^{st}$ frame and the end of the $(n-1)^{st}$ frame is faded down to provide a frame with appendage 102. The next consecutive frame in this example, frame n, has a faded-up appendage $a_{n-1}'$ appended to its beginning and its end is faded down to provide a frame with appendage 104. The next consecutive frame in this example, frame n+2, has a faded-up appendage $a_{n+1}'$ appended to its beginning and its end is faded down to provide a frame with appendage 106. Thus, each modified frame is faded up and faded down regardless of whether or not there is a discontinuity. The fade ups are shown as a linear fade up. Other fade-up functions are possible as discussed below. The fade downs are shown as a linear fade down. Other fade-down functions are possible as discussed below. The fade-up and fade-down functions may preferably be complementary, but need not be, as is also discussed further below.

Figure 11A:
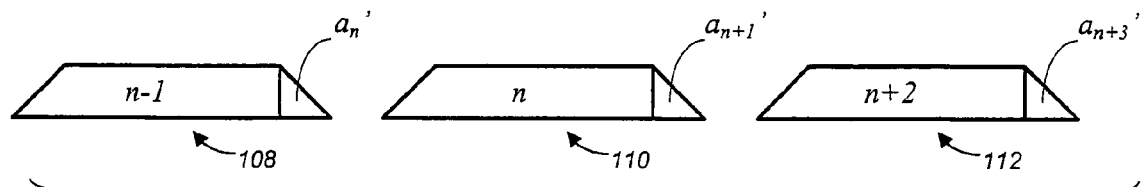
FIG. 11a is an idealized, schematic and conceptual example of three modified frames with the appendage at their end in which there is a discontinuity between one consecutive pair but not between the other.

FIG. 11*a* differs from FIG. 10*a* in that it shows an example of three modified frames for the case in which the appendage is appended to the end of the frames, one consecutive pair has no discontinuity and another pair does have a discontinuity. That is, one pair has the same sequential order as frames applied to the system and the other pair does not. The maintain or reorder function or device 94 has produced a further sequence that includes a discontinuity with respect to the original sequence. The fade-up and fade-down function or device operates on every frame whether or not a pair is discontinuous. In FIG. 11*a*, a faded-down appendage $a_n'$ is shown appended to the end of the $(n-1)^{st}$ frame and the beginning of the $(n-1)^{st}$ frame is faded up to provide a frame with appendage 108. The next consecutive frame in this example, frame n, has a faded-down appendage $a_{n+1}'$ appended to its end and its beginning is faded down to provide a frame with appendage 110. The next consecutive frame in this example, frame n+2, has a faded-down appendage $a_{n+3}'$ appended to its end and its beginning is faded down to provide a frame with appendage 112. Thus, each modified frame is faded up and faded down regardless of whether or not there is a discontinuity. The fade ups are shown as a linear fade up. Other fade-up functions are possible as discussed below. The fade downs are shown as a linear fade down. Other fade-down functions are possible as discussed below. The fade-up and fade-down functions preferably are complementary, as discussed below.

In the case of the FIG. 9*b* option, the fade up and fade down are applied by "fade up and fade down" function or device 96 to every modified frame produced by append 92. Such faded-up and faded-down modified frames are then subjected to possible reordering by maintain or reorder 94. The examples of FIGS. 10*a* and 11*a* are applicable to the output of maintain or reorder 94 of FIG. 9*b*. An example of the output of "fade up and fade down" 96 of FIG. 9*b* would be the same as the examples of FIGS. 10*a* and 11*a* except that the order of the modified frames would be the same as the order of a ordered sequence applied to append 92.

In both FIGS. 9*a* 9*b*, maintained or reordered faded-up and faded-down modified frames are applied to an "overlap and combine" function or device 98 that overlaps and additively combines every successive pair of faded-up and faded-down segments of PCM audio whether or not there is a discontinuity. Thus, every resulting frame has a crossfaded portion. When the pair of consecutive frames has the same order as the frames applied to the system, the crossfaded portion is substantially the same as the corresponding portion of the frame applied to the system. If the fade up and fade down are complementary and the complementary fading functions are obtained by a subtractive method, as discussed below, the crossfaded portion is essentially identical to the corresponding portion of the frame applied to the system. Less than essentially identical, but still substantially identical correspondence may be obtained when the complementary fading functions are obtained by a multiplicative method. When the pair of consecutive frames has a discontinuity, then the crossfaded portion provides a smooth crossfade from the PCM audio in one frame to that in the following frame, as in the FIG. 1 system when there is a discontinuity.

Figure 10B:
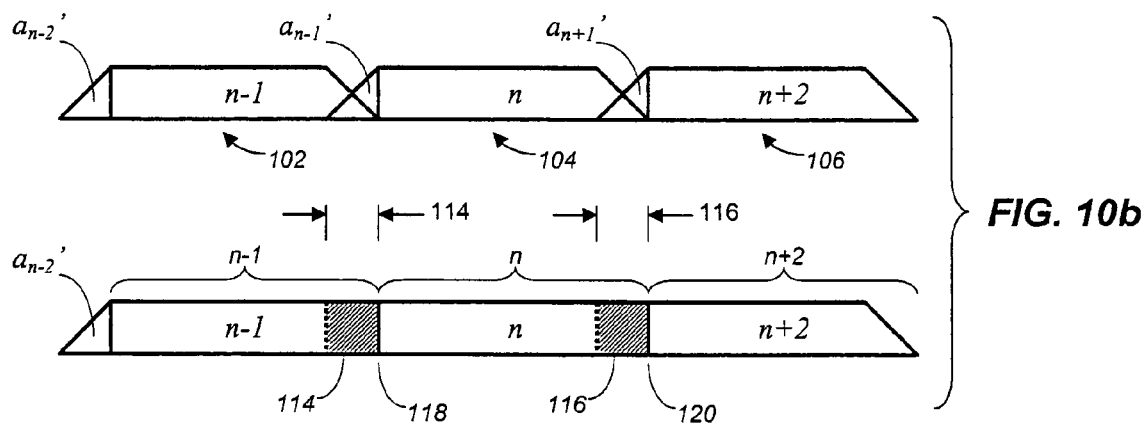
FIG. 10b is an idealized, schematic and conceptual example of the three modified frames of FIG. 10a, overlapped and combined so as to have a crossfaded portion in consecutive ones of the modified frames.

The example of FIG. 10a is shown overlapped and combined in FIG. 10b so as to have crossfaded portions 114 and 116 in successive ones of the modified frames. In this example, the overlapping and combining results in a concatenation of frames at frame boundaries 118 and 120. Crossfade 114, resulting from a pair of consecutive modified frames having no discontinuity, is between the audio in the end of frame n−1 and itself and so will be the same as the original audio in the end of frame n−1 depending on the accuracy of the fade-up and fade-down complementarity. Crossfade 116 is between the audio in the end of frame n and the audio in the end of frame n−1, just preceding frame n+2 and occurs within the end of frame n. Crossfade 116 provides a smooth crossfade from the PCM audio in frame n to that in frame n+2. An appendage such as faded-up appendage $a_{n-2}'$, appended to the beginning of frame n−1, may be used for another crossfade, which is not shown. Similarly, the down fade at the end of frame n+2 be used for another crossfade, which is not shown.

Figure 11B:
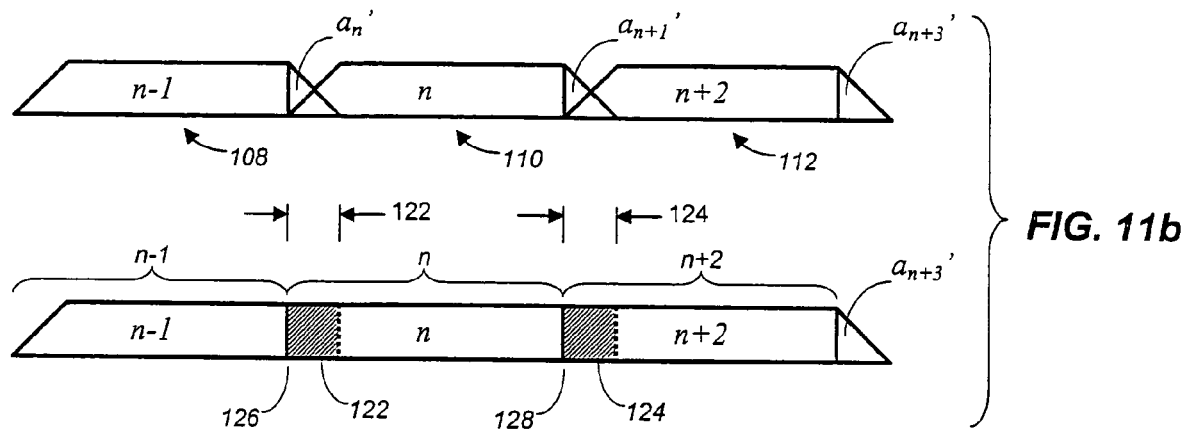
FIG. 11b is an idealized, schematic and conceptual example of the three modified frames of FIG. 11a, overlapped and combined so as to have a crossfaded portion in consecutive ones of the modified frames.

Similarly, the example of FIG. 11a is shown overlapped and combined in FIG. 11b so as to have crossfaded portion 122 and 124 in successive ones of the modified frames. In this example, the overlapping and combining results in a concatenation of frames at frame boundaries 126 and 128. Crossfade 122, resulting from a pair of consecutive modified frames having no discontinuity, is between the audio in the beginning of frame n and itself and so will be the same as the original audio in the beginning of frame n depending on the accuracy of the fade-up and fade-down complementarity. Crossfade 122 is within frame n. Crossfade 124 is between the audio in the beginning of frame n+1 and the audio in the beginning of frame n+2 and occurs within the beginning of frame n+2. Crossfade 124 provides a smooth crossfade from the PCM audio in frame n to that in frame n+2. An appendage such as faded-up appendage $a_{n-2}'$, appended to the beginning of frame n−1, may be used for another crossfade, which is not shown. Similarly, the up fade at the beginning of frame n−1 be used for another crossfade, which is not shown.

Figure 11C:
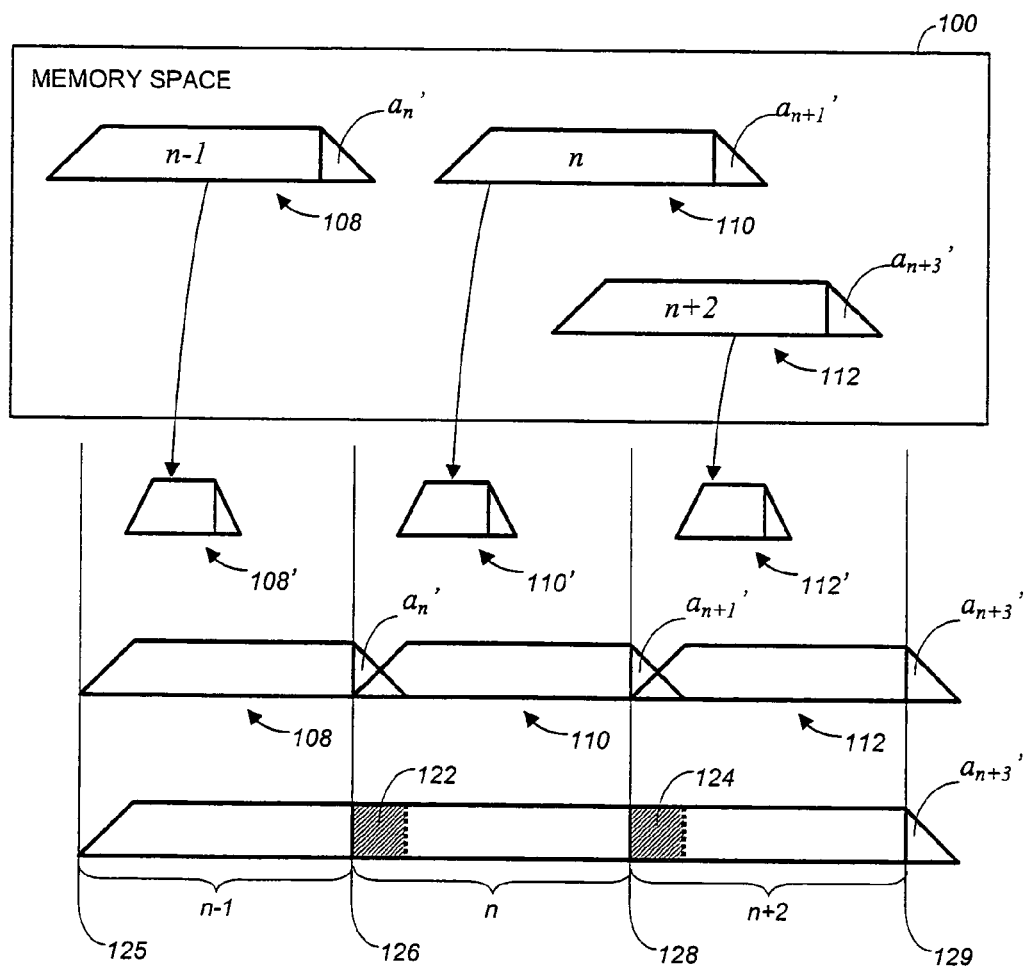
FIG. 11c is an idealized, schematic and conceptual example of the three modified frames of FIG. 11a, received from memory space, time compressed, time expanded, and overlapped and combined so as to have a crossfaded portion in consecutive ones of the modified frames.

FIG. 11c is similar to FIG. 11b, but also shows and example of the use of time compression and time expansion on the modified frames. In FIG. 11c, the three modified frames 108, 110 and 112 are shown stored in a memory space 100. Each is then time compressed so that they each fit within a frame period (frame boundaries 125, 126, 128 and 129 are shown and the time-compressed modified frames are shown as 108', 110' and 112'). In order to transmit the modified frames in a single stream, the modified frames are time compressed so that each fits within a frame period. Although they may have a duration equal to the frame length, so that the result is a continuous datastream, they may also be shorter than the frame length as in the FIG. 11c example, in which they are shown shorter than the frame period and placed arbitrarily within the frames. In practice, the time compressed frames my have a very high transmission rate (for example, across an SPDIF or AES-EBU transport) so that they take up only a fraction of the space between frame boundaries. The time compressed frames are then time decompressed, overlapped and added so as to produce a data stream having in sequence frames n−1, n and n2 with crossfaded regions 122 and 124 as in the FIG. 11b example.

Thus, in both the FIGS. 9a and 9b variations, a further ordered sequence of PCM audio frames is provided at the system output having the same order as one of the one or more ordered sequences of PCM audio frames or having one or more discontinuities between sequences of PCM audio frames, each of the sequences having the same order as one of the one or more ordered sequences of PCM audio frames or a portion thereof, consecutive pairs in the further order of PCM audio frames having an associated PCM audio crossfaded portion where the faded-up and faded-down PCM audio is overlapped and combined.

Figure 12:
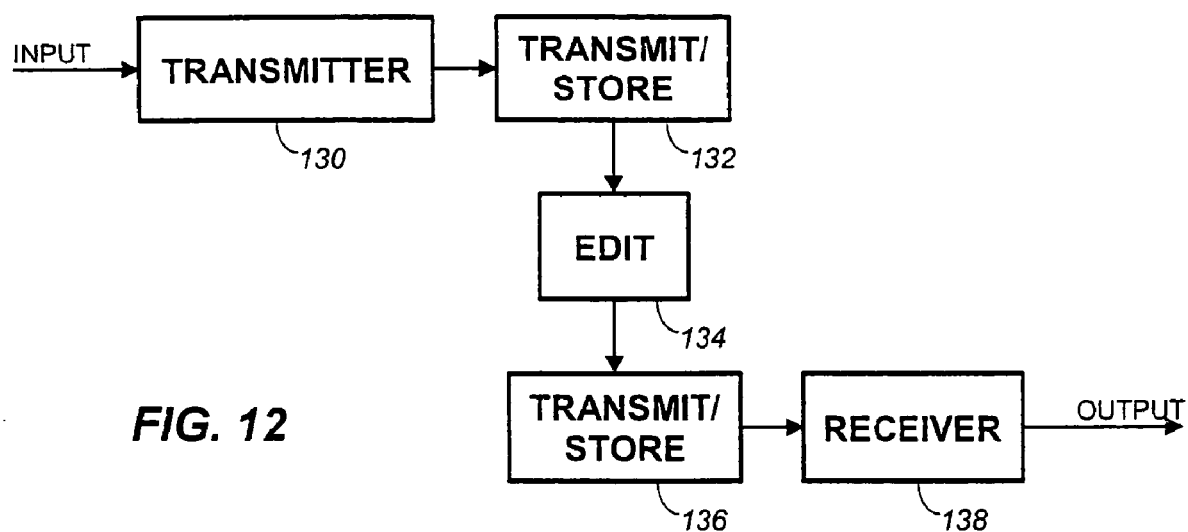
FIG. 12 is block diagram is a functional block diagram showing how the devices or functions of the systems of the first and second approaches of the invention, shown in the examples of FIGS. 1, 9a and 9b, may be separated, into a "transmitter" function or device, an optional "edit" function or device, and a "receiver" function or device. Such transmitters and receivers also form aspects of the present invention.

In practice, the devices or functions of the systems of FIGS. 1, 9a and 9b may be separated, for example, as shown in FIG. 12, into a "transmitter" function or device 130, an optional "edit" function or device 134 (there may be multiple edit functions or devices, as mentioned above), and a "receiver" function or device 138. Each of the three functions or devices may be remotely located from each other. As discussed below, edit 134 and receiver 138 may be integrated with each other. Such transmitters and receivers also form aspects of the present invention.

The output of transmitter 130 may be received by edit 134 by an optional "transmit/store" function or device 132 that transmits, stores, or transmits and stores using any suitable techniques. The output of edit 134 may be received by receiver 138 by a further optional "transmit/store" function or device 136 that transmits, stores, or transmits and stores using any suitable techniques. The transmission or storage in transmit/store 132 and 136 may be, variously, a single serial data stream, multiple data streams or data in memory space.

Transmitter 130 may include a coding device or function that encodes the transmitter output using lossy coding (such as, for example, a type of perceptual coding), lossless coding (such as, for example, Huffmann coding or Meridian Lossless Packing (MLP)) or a combination of lossy coding and lossless coding (such as, for example, perceptual coding and Huffmann coding). When transmitter 130 provides an encoded output, an appropriate decoder may be included in receiver 138. Edit 134 may include an appropriate decoder and may encode its own output. Alternatively, encoding and decoding may be applied by functions or devices separate from transmitter 130, edit 134 and receiver 138. Such coding is useful to mitigate the increased data rate that results from modified frames that are larger than the original frames by amount of their appendages. For example, if the PCM audio frames have are the same length as NTSC video frames, namely 33.37 milliseconds, and if the appendage is 5 milliseconds, the modified frames are increased by a factor of (33.37+5)/33.37 or approximately 15% with respect to the input frames. To restore the data rate, a compression ratio of 100%/(100%+15%) or approximately 87% would be required, which is quite practical with a lossless compression system.

Transmitter 130 may include a time compressor so that modified frames, which include an appendage, may be transmitted during a time interval no greater than the frames from which they are derived. Such time compression is necessary when the transmitter 130 output is a serial data stream. When transmitter 130 provides a time-compressed output, an appropriate time decompressor may be included in receiver 138. Edit 134 may include a time decompressor and may recompress its own output (most likely when the edit function or device includes a local receiver). Alternatively, time compression and decompression may be applied by functions or devices separate from transmitter 130, edit 134 and receiver 138.

A transmitter 130 according to the first approach of the invention, shown in FIG. 1 includes the append 2. An edit 134 according to the first approach of FIG. 1 includes the maintain or reorder 4. A receiver 138 according to the first approach of FIG. 1 may include the remaining devices and functions shown in FIG. 1 or, not only the remaining devices and functions shown in FIG. 1, but also the maintain or reorder 4, in which case there is no separate edit 134 (the edit function or device is part of receiver 138). These variations are summarized at the following table captioned "FIG. 1". There may be multiple edits 134, and one or more of the edits 134 may include its own local receiver.

| FIG. 1 | | |
|---|---|---|
| Transmit 130 | Edit 134 | Receiver 138 |
| 2 | 4 | 6, 8, 10, 12, 14 |
| 2 | — | 4. 6, 8, 10, 12, 14 |

A transmitter 130 according to the second approach, first variation of the invention, shown in FIG. 9a includes the append 92. An edit 134 according to the second approach, first variation of FIG. 9a may include the maintain or reorder 94 or both the maintain or reorder 94 and the fade up and fade down 96. A receiver 138 according to the second approach, first variation of FIG. 9a includes the overlap and combine 98 and may include the fade up and fade down 96 if fade up and fade down 96 is not included in edit 134, or not only fade up and fade down 96 but also maintain or reorder 94, in which case there is not separate edit 124 (the edit function or device is part of receiver 138). A receiver 138 that includes an overlap and combine 98 may also include a further maintain or reorder function or device. There may be multiple edit 134 devices or functions either apart from receiver 128 or one or more of them may be a part of receiver 138 (in which case, receiver 138 includes maintain or reorder 94, fade up and fade down 96, and overlap and combine 98). These variations are summarized at the following table captioned "FIG. 9a". There may be multiple edits 134 and one or more of the edits 134 may include its own local receiver.

| FIG. 9a | | |
|---|---|---|
| Transmit 120 | Edit 124 | Receiver 128 |
| 92 | — | 94, 96, 98 |
| 92 | 94 | 96, 98 |
| 92 | 94, 96 | 98 |

A transmitter 130 according to the second approach, second variation of the invention, shown in FIG. 9b may include the append device or function 92 or both the append device or function 92 and the fade up and fade down 96. An edit 134 according to the second approach, second variation of FIG. 9b may include the maintain or reorder 94. A receiver 138 according to the second approach, second variation of FIG. 9b includes the overlap and combine 98 and may include the maintain or reorder 94 or both the maintain or reorder 94 and the fade up and fade down 96 if the edit function or device is part of the receiver. A receiver 138 that includes an overlap and combine 98 may also include a further maintain or reorder function or device. There may be multiple edit 134 devices or functions either apart from receiver 138 or one or more of them may be a part of receiver 138. These variations are summarized at the following table captioned "FIG. 9b". There may be multiple edits 134 and one or more of the edits 134 may include its own local receiver

| FIG. 9b | | |
|---|---|---|
| Transmit 120 | Edit 124 | Receiver 128 |
| 92 | — | 96, 94, 98 |
| 92, 96 | 94 | 98 |
| 92, 96 | — | 94, 98 |

Modulation Envelope

The fade-up and fade-down modulation envelope and the length of the crossfade region both have a direct impact on the audibility of the splice edit or crossfade.

A modulation envelope is a gain shape or profile which, when applied to the audio samples, typically transitions the audio from unity (gain=1.0) to silence (gain=0.0), or vice versa. Various functions exist for generating this modulation envelope and each provides for a different way of spectrally spreading the distortion created by the crossfade. Commonly used crossfade functions include a linear ramp (as shown in the various figures herein), log, Hanning, Hamming and sine.

The length of the crossfade region is the amount of time, in samples or seconds that is required to complete the crossfade. If the length of the crossfade region is too small (for example less than 5 milliseconds), the crossfade is not as effective at suppressing audible clicks or thumps. As one introduces crossfading and increases the overlap from zero, clicks turn into thumps that then become less and less audible as the length of the overlap grows. By the time one reaches a few ms or low tens of ms, one has substantially reduced the thumps to inaudibility (assuming a sensible design of fading function). However using a longer crossfade region also has two drawbacks. First, it results in an increase in the number of redundant samples associated with each frame (thus an increase in data rate overhead). Second, a listener will begin to notice the mixture of content in the crossfade region, which in certain circumstances, may not be desirable. For example, if dissimilar musical passages are being crossfaded, the crossfade region will have a mixture of different musical keys and tempos. If the crossfade is of sufficient length (for example greater than 100 milliseconds), the mixture will become apparent and most likely annoying.

It is therefore desirable to have a crossfade region length and modulation envelope function that together provide for a short transition time while minimizing audible artifacts. In practice, a Kaiser Bessel derived (KBD) squared function, as defined U.S. Pat. No. 5,903,872, with an alpha factor set equal to 1 and an overlap length of approximately 5 milliseconds has been found to be satisfactory.

In this invention, particularly in the second approach of the invention, shown in the examples of FIGS. 9a and 9b, the fade-up and fade-down modulation envelope function is typically symmetrical and complementary. By "symmetrical" is meant that the fading down envelope and the fading up envelope are time-reversed equivalents of each other. By "complementary" is meant that the fading down envelope and the fading up envelope sum to unity through the crossfade. However, the invention, particularly the first approach of the invention, shown in the example of FIG. 1, does not preclude the use of asymmetric and/or non-complementary modulation envelopes. For example, it may be useful to alter the modulation envelope based on audio signal characteristics. If non-complementary modulation envelopes that summed to more than unity were to be used, it is possible that the resulting crossfaded audio may "clip"—that is sample values may exceed the gain limits of the unpacking device.

Crossfading Every Frame Boundary and Rounding Errors

As mentioned above, the second approach of the invention, as shown in the example of FIGS. 9a and 9b, preferably employs complementary modulation envelopes that do not introduce rounding errors.

Consider the following example of using complementary modulation envelopes. S(n) is an array of eight audio samples (index n=0 to 7) of random value in the range 0 to 1 and quantized to a precision of 3 bits (step size of one eighth or 0.125). In the following equation, the function random(8) generates an infinite precision value of uniform probability in the range 0 to 8 and the function round() rounds values to the nearest integer.

$$S(n) = \frac{\text{round}(\text{random}(8))}{8} \quad \text{for } n = 0 \text{ to } 7 \tag{1}$$

W(n) is a modulation envelope also quantized to a precision of 3 bits. In this example, a quarter sine wave has been selected but the modulation envelope function is arbitrary.

$$W(n) = \frac{\text{round}\left(8 \cdot \sin\left(\frac{\pi \cdot n}{16}\right)\right)}{8} \quad \text{for } n = 0 \text{ to } 7 \tag{2}$$

The complementary modulation envelope is one minus the window W(n), so that the sum of the modulation envelope and the complementary modulation envelope is one.

$$W(n)+(1-W(n))=1 \text{ for n=0 to 7} \tag{3}$$

The following table shows the randomly generated samples as well as the modulation envelope and complementary modulation envelope coefficients.

| n | S(n) | W(n) | 1 − W(n) |
|---|------|------|----------|
| 0 | 0.875 | 0.000 | 1.000 |
| 1 | 0.875 | 0.250 | 0.750 |
| 2 | 0.250 | 0.375 | 0.625 |
| 3 | 0.125 | 0.500 | 0.500 |
| 4 | 0.750 | 0.750 | 0.250 |
| 5 | 0.625 | 0.875 | 0.125 |
| 6 | 0.125 | 0.875 | 0.125 |
| 7 | 0.625 | 1.000 | 0.000 |

Applying each modulation envelope to the samples and performing rounding to a precision of 3 bits, results in the following two arrays, A(n) and B(n).

$$A(n) = \frac{\text{round}(8 \cdot S(n) \cdot W(n))}{8} \quad \text{for } n = 0 \text{ to } 7 \tag{4}$$

$$B(n) = \frac{\text{round}(8 \cdot S(n) \cdot (1-W(n)))}{8} \quad \text{for } n = 0 \text{ to } 7 \tag{5}$$

| n | A(n) | B(n) | Error [A(n) + B(n) − S(n)] |
|---|------|------|---------------------------|
| 0 | 0.000 | 0.875 | 0.000 |
| 1 | 0.250 | 0.625 | 0.000 |
| 2 | 0.125 | 0.125 | 0.000 |
| 3 | 0.125 | 0.125 | 0.125 |
| 4 | 0.625 | 0.250 | 0.125 |

Ideally, the sum of A(n) and B(n) should be equal to the original samples S(n) however a comparison of the original samples with the sum shows that there is rounding error for some samples (indexes n=3 and 4).

Complementary Crossfade

If instead of deriving the samples B(n) by multiplying S(n) by 1−W(n), they are generated by subtraction, the rounding errors cancel. This is defined in this invention as a "complementary crossfade." Thus the new samples B'(n) are derived as S(n) minus A(n).

$$B'(n)=S(n)-A(n) \text{ for n=0 to 7} \tag{7}$$

The error can now be expressed as A(n)+B'(n)−S(n) which simplifies to A(n)+S(n)−A(n)−S(n)=0 (for all n).

Thus, if complementary modulation envelopes are derived by such a subtractive technique, then rounding errors will cancel for pairs of sequential frames that do not have a discontinuity—that is, adjacent sequential frames that were created from the same original audio information signal.

The present invention and its various aspects may be implemented in analog circuitry, or more probably as software functions performed in digital signal processors, programmed general-purpose digital computers, and/or special purpose digital computers. Interfaces between analog and digital signal streams may be performed in appropriate hardware and/or as functions in software and/or firmware. Although the present invention and its various aspects may involve analog or digital signals, in practical applications most or all processing functions are likely to be performed in the digital domain on digital signal streams in which audio signals are represented by samples.

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

We claim:

1. A method for processing one or more ordered sequences of PCM audio frames, comprising appending to the beginning of frames, a segment of PCM audio that is substantially a replica of PCM audio in the end of the preceding frame in an ordered sequence, or, to the end of frames, a segment of PCM audio that is substantially a replica of PCM audio in the beginning of the following frame in an ordered sequence, whereby modified frames are produced, maintaining for the modified frames a sequential order that is the same as the order of one of said one or more ordered sequences of the PCM audio frames or assigning a further sequential order to the modified frames, which sequential order is different from the order of one of said one or more ordered sequences of PCM audio frames, whereby the further sequential order has at least one discontinuity in its order with respect to the order of one of said one or more ordered sequences of PCM audio frames, fading up the PCM audio appended to the beginning of the modified frame following a discontinuity and fading down the PCM audio in the end of the modified frame preceding a discontinuity when segments are appended to the beginning of frames or fading down the PCM audio appended to the end of the modified frame preceding a discontinuity and fading up the PCM audio in the beginning of the modified frame following a discontinuity when segments are appended to the end of frames, overlapping and additively combining the faded-up and faded-down PCM audio preceding and following a discontinuity in the sequence of faded-up and faded-down modified frames, and removing the segment of PCM audio appended to a modified frame in sequential pairs of modified frames and joining the resulting PCM audio frames when the sequential pair of modified frames does not contain a discontinuity following or preceding the appendage, whereby a further ordered sequence of PCM audio frames is provided having the same order as one of said one or more ordered sequences of PCM audio frames or having one or more discontinuities between sequences of PCM audio frames, each of said sequences having the same order as one of said one or more ordered sequences of PCM audio frames or a portion thereof, discontinuities having an associated PCM audio crossfaded portion where said faded-up and faded-down PCM audio is overlapped and combined.

2. A method for processing one or more ordered sequences of PCM audio frames, comprising appending only to the beginning of frames, a segment of PCM audio that is substantially a replica of PCM audio in the end of the preceding frame in an ordered sequence, or, to the end of frames, a segment of PCM audio that is substantially a replica of PCM audio in the beginning of the following frame in an ordered sequence, whereby modified frames are produced, and transmitting, storing, or transmitting and storing the modified frames for subsequent processing in which the sequential order of the modified frames is maintained or modified, audio segments preceding a discontinuity are faded down and audio segments following a discontinuity are faded up, then the audio segments are additively combined.

3. A method according to claim 2 further comprising time compressing the modified frames and wherein said transmitting, storing, or transmitting and storing transmits, stores, or transmits and stores time-compressed modified frames.

4. A method according to claim 2 further comprising time compressing and encoding the modified frames and wherein said transmitting, storing, or transmitting and storing transmits, stores, or transmits and stores time-compressed and encoded modified frames.

5. A method for processing PCM audio data, comprising receiving modified PCM audio frames, wherein the modified frames were produced by processing one or more ordered sequences of PCM audio frames by appending to the beginning of frames, a segment of PCM audio that is substantially a replica of PCM audio in the end of the preceding frame in an ordered sequence, or, to the end of frames, a segment of PCM audio that is substantially a replica of PCM audio in the beginning of the following frame in an ordered sequence, maintaining for the modified frames a sequential order that is the same as the order of one of said one or more ordered sequences of the PCM audio frames or assigning a further sequential order to the modified frames, which sequential order is different from the order of one of said one or more ordered sequences of PCM audio frames, whereby the further sequential order has at least one discontinuity in its order with respect to the order of one of said one or more ordered sequences of PCM audio frames, fading up the PCM audio appended to the beginning of the modified frame following a discontinuity and fading down the PCM audio in the end of the modified frame preceding a discontinuity when segments are appended to the beginning of frames or fading down the PCM audio appended to the end of the modified frame preceding a discontinuity and fading up the PCM audio in the beginning of the modified frame following a discontinuity when segments are appended to the end of frames, overlapping and additively combining the faded-up and faded-down PCM audio preceding and following a discontinuity in the sequence of faded-up and faded-down modified frames, and removing the segment of PCM audio appended to a modified frame in sequential pairs of modified frames and joining the resulting PCM audio frames when the sequential pair of modified frames does not contain a discontinuity following or preceding the appendage, whereby a further ordered sequence of PCM audio frames is provided having the same order as one of said one or more ordered sequences of PCM audio frames or having one or more discontinuities between sequences of PCM audio frames, each of said sequences having the same order as one of said one or more ordered sequences of PCM audio frames or a portion thereof, discontinuities having an associated PCM audio crossfaded portion where said faded-up and faded-down PCM audio is overlapped and combined.

6. The method of claim 5 wherein the received modified PCM audio frames are time-compressed, the method further comprising time decompressing the received modified PCM audio frames.

7. The method of claim 5 wherein the received modified PCM audio frames are time-compressed and encoded, the method further comprising time decompressing and decoding the received modified PCM audio frames.

8. A method for processing PCM audio data, comprising receiving modified PCM audio frames, wherein the modified frames were produced by processing one or more ordered sequences of PCM audio frames by appending to the beginning of frames, a segment of PCM audio that is substantially a replica of PCM audio in the end of the preceding frame in an ordered sequence, or, to the end of frames, a segment of PCM audio that is substantially a replica of PCM audio in the beginning of the following frame in an ordered sequence, and have a sequential order that is the same as the order of one of said one or more ordered sequences of the PCM audio frames or have a further sequential order, which sequential order is different from the order of one of said one or more ordered sequences of PCM audio frames, whereby the further sequential order has at least one discontinuity in its order with respect to the order of one of said one or more ordered sequences of PCM audio frames, fading up the PCM audio appended to the beginning of the modified frame following a discontinuity and fading down the PCM audio in the end of the modified frame preceding a discontinuity when segments are appended to the beginning of frames or fading down the PCM audio appended to the end of the modified frame preceding a discontinuity and fading up the PCM audio in the beginning of the modified frame following a discontinuity when segments are appended to the end of frames, overlapping and additively combining the faded-up and faded-down PCM audio preceding and following a discontinuity in the sequence of faded-up and faded-down modified frames, and removing the segment of PCM audio appended to a modified frame in sequential pairs of modified frames and joining the resulting PCM audio frames when the sequential pair of modified frames does not contain a discontinuity following or preceding the appendage, whereby a further ordered sequence of PCM audio frames is provided having the same order as one of said one or more ordered sequences of PCM audio frames or having one or more discontinuities between sequences of PCM audio frames, each of said sequences having the same order as one of said one or more ordered sequences of PCM audio frames or a portion thereof, discontinuities having an associated PCM audio crossfaded portion where said faded-up and faded-down PCM audio is overlapped and combined.

9. The method of claim 8 wherein the received modified PCM audio frames are time-compressed, the method further comprising time decompressing the received modified PCM audio frames.

10. The method of claim 8 wherein the received modified PCM audio frames are time-compressed and encoded, the method further comprising time decompressing and decoding the received modified PCM audio frames.

11. The method of claim 8 further comprising
maintaining for the modified frames a sequential order that is the same as their order as received, whereby the modified frames may have a sequential order that has at least one discontinuity in its order with respect to the order of one of said one or more ordered sequences of PCM audio frames, or assigning a further sequential order to the modified frames, which sequential order is different from their order as received, whereby the further sequential order has at least one discontinuity in its order with respect to the order of one of said one or more ordered sequences of PCM audio frames.

12. A method for processing one or more ordered sequences of PCM audio frames, comprising appending to the beginning of frames, a segment of PCM audio that is substantially a replica of PCM audio in the end of the preceding frame in an ordered sequence, or, to the end of frames, a segment of PCM audio that is substantially a replica of PCM audio in the beginning of the following frame in an ordered sequence, whereby modified frames are produced, fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, maintaining for the modified frames or for the faded-up and faded-down modified frames a sequential order that is the same as the order of one of said one or more ordered sequences of the PCM audio frames or assigning a further sequential order to the modified frames or to the faded-up and faded-down modified frames, which sequence is different from the order of one of said one or more ordered sequences of PCM audio frames, whereby the further sequential order has at least one discontinuity in its order with respect to the order of one of said one or more ordered sequences of PCM audio frames, and overlapping and additively combining sequential pairs of faded-up and faded-down PCM audio in the sequence of faded-up and faded-down modified frames having a sequential order that is the same as the order of one of said one or more ordered sequences of the PCM audio frames or having said further sequential order, whereby a further ordered sequence of PCM audio frames is provided having the same order as one of said one or more ordered sequences of PCM audio frames or having one or more discontinuities between sequences of PCM audio frames, each of said sequences having the same order as one of said one or more ordered sequences of PCM audio frames or a portion thereof, consecutive pairs in the further order of PCM audio frames having an associated PCM audio crossfaded portion where said faded-up and faded-down PCM audio is overlapped and combined.

13. A method for processing one or more ordered sequences of PCM audio frames, comprising appending only to the beginning of frames, a segment of PCM audio that is substantially a replica of PCM audio in the end of the preceding frame in an ordered sequence, or, to the end of frames, a segment of PCM audio that is substantially a replica of PCM audio in the beginning of the following frame in an ordered sequence, whereby modified frames are produced, fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, and transmitting, storing, or transmitting and storing the faded-up and faded-down modified frames.

14. A method according to claim 13 further comprising time compressing the faded-up and faded-down modified frames and wherein said transmitting, storing, or transmitting and storing transmits, stores, or transmits and stores time-compressed faded-up and faded-down modified frames.

15. A method according to claim 13 further comprising time compressing and encoding the faded-up and faded-down modified frames and wherein said transmitting, storing, or transmitting and storing transmits, stores, or transmits and stores time-compressed, encoded, faded-up and faded-down modified frames.

16. A method according to claim 8 wherein the fade-up and faded-down modified frames were produced by processing that multiplies a portion of PCM audio by a fading function and subtracts the portion of PCM audio resulting from the multiplication from another portion of PCM audio.

17. A method for processing PCM audio, comprising receiving faded-up and faded-down modified PCM audio frames, wherein the faded-up and faded-down modified frames were produced by processing one or more ordered sequences of PCM audio frames by appending to the beginning of frames, a segment of PCM audio that is substantially a replica of PCM audio in the end of the preceding frame in an ordered sequence, or, to the end of frames, a segment of PCM audio that is substantially a replica of PCM audio in the beginning of the following frame in an ordered sequence, and fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, maintaining for the faded-up and faded-down modified frames a sequential order that is the same as the order of one of said one or more ordered sequences of the PCM audio frames or assigning a further sequential order to the faded-up and faded-down modified frames, which sequence is different from the order of one of said one or more ordered sequences of PCM audio frames, whereby the further sequential order has at least one discontinuity in its order with respect to the order of one of said one or more ordered sequences of PCM audio frames, and overlapping and additively combining sequential pairs of faded-up and faded-down PCM audio in the sequence of faded-up and faded-down modified frames, whereby a further ordered sequence of PCM audio frames is provided in which consecutive pairs of PCM audio frames have a PCM audio crossfaded portion where said faded-up and faded-down PCM audio is overlapped and combined.

18. The method of claim 17 wherein the received faded-up and faded-down modified PCM audio frames are time-compressed, the method further comprising time decompressing the received modified PCM audio frames.

19. The method of claim 17 wherein the received faded-up and faded-down modified PCM audio frames are time-compressed and encoded, the method further comprising time decompressing and decoding the received modified PCM audio frames.

20. The method of claim 19 wherein the received faded-up and faded-down modified PCM audio frames are encoded with a lossless coding.

21. A method according to claim 17 or 20 wherein the fade-up and faded-down modified frames were produced by processing that multiplies a portion of PCM audio by a fading function and subtracts the portion of PCM audio resulting from the multiplication from another portion of PCM audio and wherein the further sequence of PCM audio frames have the same order as at least a portion of the received ordered sequence of PCM audio frames, whereby the further sequence of PCM audio frames constitutes a substantially identical reconstruction of said at least a portion of the received ordered sequence of PCM audio frames.

22. A method for processing PCM audio, comprising receiving faded-up and faded-down modified PCM audio frames, wherein the faded-up and faded-down modified frames were produced by processing one or more ordered sequences of PCM audio frames by appending to the beginning of frames, a segment of PCM audio that is substantially a replica of PCM audio in the end of the preceding frame in an ordered sequence, or, to the end of frames, a segment of PCM audio that is substantially a replica of PCM audio in the beginning of the following frame in an ordered sequence, and fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, wherein the faded-up and faded-down modified PCM audio frames have a sequential order that is the same as the order of one of said one or more ordered sequences of the PCM audio frames or have a further sequential order, which sequential order is different from the order of one of said one or more ordered sequences of PCM audio frames, whereby the further sequential order has at least one discontinuity in its order with respect to the order of one of said one or more ordered sequences of PCM audio frames, and overlapping and additively combining sequential pairs of faded-up and faded-down PCM audio in the sequence of faded-up and faded-down modified frames, whereby a further ordered sequence of PCM audio frames is provided in which consecutive pairs of PCM audio frames have a PCM audio crossfaded portion where said faded-up and faded-down PCM audio is overlapped and combined.

23. The method of claim 22 wherein the received faded-up and faded-down modified PCM audio frames are time-compressed, the method further comprising time decompressing the received modified PCM audio frames.

24. The method of claim 22 wherein the received faded-up and faded-down modified PCM audio frames are time-compressed and encoded, the method further comprising time decompressing and decoding the received modified PCM audio frames.

25. The method of claim 24 wherein the received faded-up and faded-down modified PCM audio frames are encoded with a lossless coding.

26. A method according to claim 22 or 25 wherein the fade-up and faded-down modified frames were produced by processing that multiplies a portion of PCM audio by a fading function and subtracts the portion of PCM audio resulting from the multiplication from another portion of PCM audio and wherein the further sequence of PCM audio frames have the same order as at least a portion of the received ordered sequence of PCM audio frames, whereby the further sequence of PCM audio frames constitutes a substantially identical reconstruction of said at least a portion of the received ordered sequence of PCM audio frames.

27. The method of claim 22 further comprising
maintaining for the modified frames a sequential order that is the same as their order as received, whereby the modified frames may have a sequential order that has at least one discontinuity in its order with respect to the order of one of said one or more ordered sequences of PCM audio frames, or assigning a further sequential order to the modified frames, which sequential order is different from their order as received, whereby the further sequential order has at least one discontinuity in its order with respect to the order of one of said one or more ordered sequences of PCM audio frames.

28. A method for processing PCM audio, comprising receiving modified PCM audio frames, wherein the modified frames were produced by processing one or more ordered sequences of PCM audio frames by appending to the beginning of frames, a segment of PCM audio that is substantially a replica of PCM audio in the end of the preceding frame in an ordered sequence, or, to the end of frames, a segment of PCM audio that is substantially a replica of PCM audio in the beginning of the following frame in an ordered sequence, fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, maintaining for the modified frames or for the faded-up and faded-down modified frames a sequential order that is the same as the order of one of said one or more ordered sequences of the PCM audio frames or assigning a further sequential order to the modified frames or to the faded-up and faded-down modified frames, which sequence is different from the order of one of said one or more ordered sequences of PCM audio frames, whereby the further sequential order has at least one discontinuity in its order with respect to the order of one of said one or more ordered sequences of PCM audio frames, and overlapping and additively combining sequential pairs of faded-up and faded-down PCM audio in the sequence of faded-up and faded-down modified frames, having a sequential order that is the same as the order of one of said one or more ordered sequences of the PCM audio frames or having said further sequential order, whereby a further ordered sequence of PCM audio frames is provided in which consecutive pairs of PCM audio frames have a PCM audio crossfaded portion where said faded-up and faded-down PCM audio is overlapped and combined.

29. The method of claim 28 wherein the received modified PCM audio frames are time-compressed, the method further comprising time decompressing the received modified PCM audio frames.

30. The method of claim 28 wherein the received modified PCM audio frames are time-compressed and encoded, the method further comprising time decompressing and decoding the received modified PCM audio frames.

31. The method of claim 30 wherein the received modified PCM audio frames are encoded with a lossless coding.

32. A method according to claim 28 or 31 wherein fading up and fading down includes multiplying a portion of PCM audio by a fading function and subtracting the portion of PCM audio resulting from the multiplication from another portion of PCM and wherein the further sequence of PCM audio frames have the same order as at least a portion of the received ordered sequence of PCM audio frames, whereby the further sequence of PCM audio frames constitutes a substantially identical reconstruction of said at least a portion of the received ordered sequence of PCM audio frames.

33. A method for processing PCM audio, comprising receiving modified PCM audio frames, wherein the modified frames were produced by processing one or more ordered sequences of PCM audio frames by appending to the beginning of frames, a segment of PCM audio that is substantially a replica of PCM audio in the end of the preceding frame in an ordered sequence, or, to the end of frames, a segment of PCM audio that is substantially a replica of PCM audio in the beginning of the following frame in an ordered sequence, and have a sequential order that is the same as the order of one of said one or more ordered sequences of the PCM audio frames or have a further sequential order, which sequential order is different from the order of one of said one or more ordered sequences of PCM audio frames, whereby the further sequential order has at least one discontinuity in its order with respect to the order of one of said one or more ordered sequences of PCM audio frames, fading up the PCM audio appended to the beginning of modified frames and fading down the PCM audio in the end of modified frames when segments are appended to the beginning of frames or fading down the PCM audio appended to the end of modified frames and fading up the PCM audio in the beginning of modified frames when segments are appended to the end of frames, and overlapping and additively combining sequential pairs of faded-up and faded-down PCM audio in the sequence of faded-up and faded-down modified frames, whereby a further ordered sequence of PCM audio frames is provided in which consecutive pairs of PCM audio frames have a PCM audio crossfaded portion where said faded-up and faded-down PCM audio is overlapped and combined.

34. The method of claim 33 wherein the received faded-up and faded-down modified PCM audio frames are time-compressed, the method further comprising time decompressing the received modified PCM audio frames.

35. The method of claim 33 wherein the received faded-up and faded-down modified PCM audio frames are time-compressed and encoded, the method further comprising time decompressing and decoding the received modified PCM audio frames.

36. The method of claim 33 further comprising maintaining for the modified frames a sequential order that is the same as their order as received, whereby the modified frames may have a sequential order that has at least one discontinuity in its order with respect to the order of one of said one or more ordered sequences of PCM audio frames, or assigning a further sequential order to the modified frames, which sequential order is different from their order as received, whereby the further sequential order has at least one discontinuity in its order with respect to the order of one of said one or more ordered sequences of PCM audio frames.

* * * * *